United States Patent
Sugihara

(10) Patent No.: US 12,247,997 B2
(45) Date of Patent: Mar. 11, 2025

(54) FROTH BUBBLE MOVING SPEED MEASURING DEVICE AND METHOD OF MEASURING FROTH BUBBLE MOVING SPEED, FLOTATION APPARATUS AND FLOTATION METHOD USING SAME

(71) Applicant: SUMITOMO METAL MINING CO., LTD., Tokyo (JP)

(72) Inventor: Jun Sugihara, Tokyo (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 629 days.

(21) Appl. No.: 17/455,076

(22) Filed: Nov. 16, 2021

(65) Prior Publication Data

US 2022/0074965 A1 Mar. 10, 2022

Related U.S. Application Data

(63) Continuation of application No. PCT/JP2020/019592, filed on May 18, 2020.

(30) Foreign Application Priority Data

May 24, 2019 (JP) .................................. 2019-097860

(51) Int. Cl.
*B03D 1/02* (2006.01)
*B03D 1/16* (2006.01)
(Continued)

(52) U.S. Cl.
CPC .................. *G01P 5/20* (2013.01); *B03D 1/02* (2013.01); *B03D 1/16* (2013.01); *G06T 7/0002* (2013.01)

(58) Field of Classification Search
CPC .... G01P 5/20; G01P 5/26; B03D 1/02; B03D 1/16; B03D 1/028; G06T 7/0002; G06T 2207/10016; G06T 7/246; G06T 7/62
See application file for complete search history.

(56) References Cited

U.S. PATENT DOCUMENTS 4,668,382 A * 5/1987 Jameson .................. B03D 1/16
210/221.2
6,727,990 B1 * 4/2004 Niemi ...................... B03D 1/14
356/442

(Continued)

FOREIGN PATENT DOCUMENTS

CN 101339663 1/2009
CN 103604946 2/2014
(Continued)

OTHER PUBLICATIONS

Jahedsaravani, Prediction of the metallurgical performances of a batch flotation system by image analysis and neural networks; Mineral Engineering vol. 60, Dec. 2014, pp. 137-145. (Year: 2014).*

(Continued)

*Primary Examiner* — Patrick H Mackey
(74) *Attorney, Agent, or Firm* — IPUSA, PLLC

(57) ABSTRACT

A froth bubble moving speed measuring device includes a light source configured to illuminate an upper surface of a flotation tank, an imaging unit configured to capture at least a part of the upper surface of the flotation tank, and an arithmetic processing unit configured to calculate a moving speed of a froth bubble by calculating a moving distance of the froth bubble based on the image processed by the image processing unit.

4 Claims, 6 Drawing Sheets

(51) Int. Cl.
    *G01P 5/20*           (2006.01)
    *G06T 7/00*           (2017.01)

(56) References Cited

U.S. PATENT DOCUMENTS

| | | | |
|---|---|---|---|
| 6,778,881 B1 * | 8/2004 | Du Plessis | B03D 1/028 |
| | | | 700/265 |
| 6,793,079 B2 * | 9/2004 | Khan | B03D 1/14 |
| | | | 209/168 |
| 6,962,618 B2 * | 11/2005 | Gaus | B03D 1/16 |
| | | | 95/260 |
| 8,008,931 B2 * | 8/2011 | Parvinen | B03D 1/028 |
| | | | 324/693 |
| 8,131,020 B2 * | 3/2012 | Macgregor | G05B 19/41875 |
| | | | 382/110 |
| 9,652,841 B2 * | 5/2017 | Bojovschi | G01N 13/02 |
| 10,372,144 B2 * | 8/2019 | Bojovschi | C02F 1/24 |
| 10,960,409 B2 * | 3/2021 | Kosick | B03D 1/02 |

FOREIGN PATENT DOCUMENTS

| | | |
|---|---|---|
| CN | 105488816 | 4/2016 |
| JP | 2013-180289 | 9/2013 |

OTHER PUBLICATIONS

International Search Report mailed on Aug. 11, 2020 with respect to PCT/JP2020/019592.

* cited by examiner

FROTH BUBBLE MOVING SPEED MEASURING DEVICE AND METHOD OF MEASURING FROTH BUBBLE MOVING SPEED, FLOTATION APPARATUS AND FLOTATION METHOD USING SAME

CROSS-REFERENCE TO RELATED APPLICATION

This patent application is a continuation of International Patent Application No. PCT/JP2020/019592, filed on May 18, 2020, which is based upon and claims priority to Japanese Patent Application No. 2019-097860, filed on May 24, 2019, the entire content of which are incorporated herein by reference.

BACKGROUND

1. Field of the Invention

The present invention relates to a froth bubble moving speed measuring device and a method of measuring froth bubble moving speed, and a flotation apparatus and a flotation method using the same.

2. Description of the Related Art

Flotation is conventionally known as a method for separating valuable components in ores from other components when recovering valuable components contained in ores, as described in Japanese Patent Application Laid-Open No. 2013-180289. In this flotation, a slurry is famed by mixing ground materials obtained by grinding ores into a liquid such as water, and then air is blown into the slurry. Then, because a ground material having a high affinity with air floats, the floating ground material can be separated from the other ground material. In a flotation, a number of reagents, such as foaming agents and trapping agents, are added to the slurry to allow the ground material to float with air. Thus, by adjusting reagents to be added in the slurry, the ground material containing the desired valuable component is floated with air.

Depending on the amount of air blown into the slurry, the separation properties of the ground material for separating floating materials from non-floating materials (i.e., sedimentary material to settle out) vary. For example, if the amount of air blown into the slurry is increased, the ground material containing the desired valuable component is more likely to float and this improves the recovery, but other ground materials are also more likely to float. As a result, when the amount of air blown into the slurry increases, the amount of impurities contained in the recovered ground material increases. Therefore, in order to improve the recoverability of the ground material containing the desired valuable components while improving the quality of the recovered ground material, it is necessary to appropriately control the amount of air blown into the slurry.

The quality and ore recovery are determined by reagent adjustment, air volume adjustment, and the rotational speed of the impeller (rotor blade) of a flotation machine. Currently, qualitative determinations are made by visualizing not only the size of the froth bubble that has floated up on the upper surface of the flotation apparatus but also the moving speed of the froth bubble.

SUMMARY OF THE INVENTION

Problems to be Solved by the Invention

However, in conventional qualitative determination by visual inspection, there was a large error in determination by an operator, and a reagent adjustment, an air volume adjustment, and a speed adjustment of the impeller (rotor blade) could not be performed appropriately.

Accordingly, the present invention is intended to provide a froth bubble moving speed measuring apparatus and a method of measuring a froth bubble moving speed, and a flotation apparatus and a flotation method using the apparatus and the method that measure the froth bubble moving speed in situ using images and digitize the speed in real time.

Means for Solving the Problem

In order to achieve the above-described object, a froth bubble moving speed measuring device according to an embodiment of the present invention includes a light source configured to illuminate an upper surface of a flotation tank, an imaging unit configured to capture at least a part of the upper surface of the flotation tank, and an arithmetic processing unit configured to calculate a moving speed of a froth bubble by calculating a moving distance of the froth bubble based on the image processed by the image processing unit.

BRIEF DESCRIPTION OF THE DRAWINGS

FIG. 7 is an image of froth bubbles in which FIGS. 5 and 6 are superimposed.

MODE OF CARRYING OUT THE INVENTION

Hereinafter, embodiments for carrying out the present invention will be described with reference to the drawings.

Figure 1:
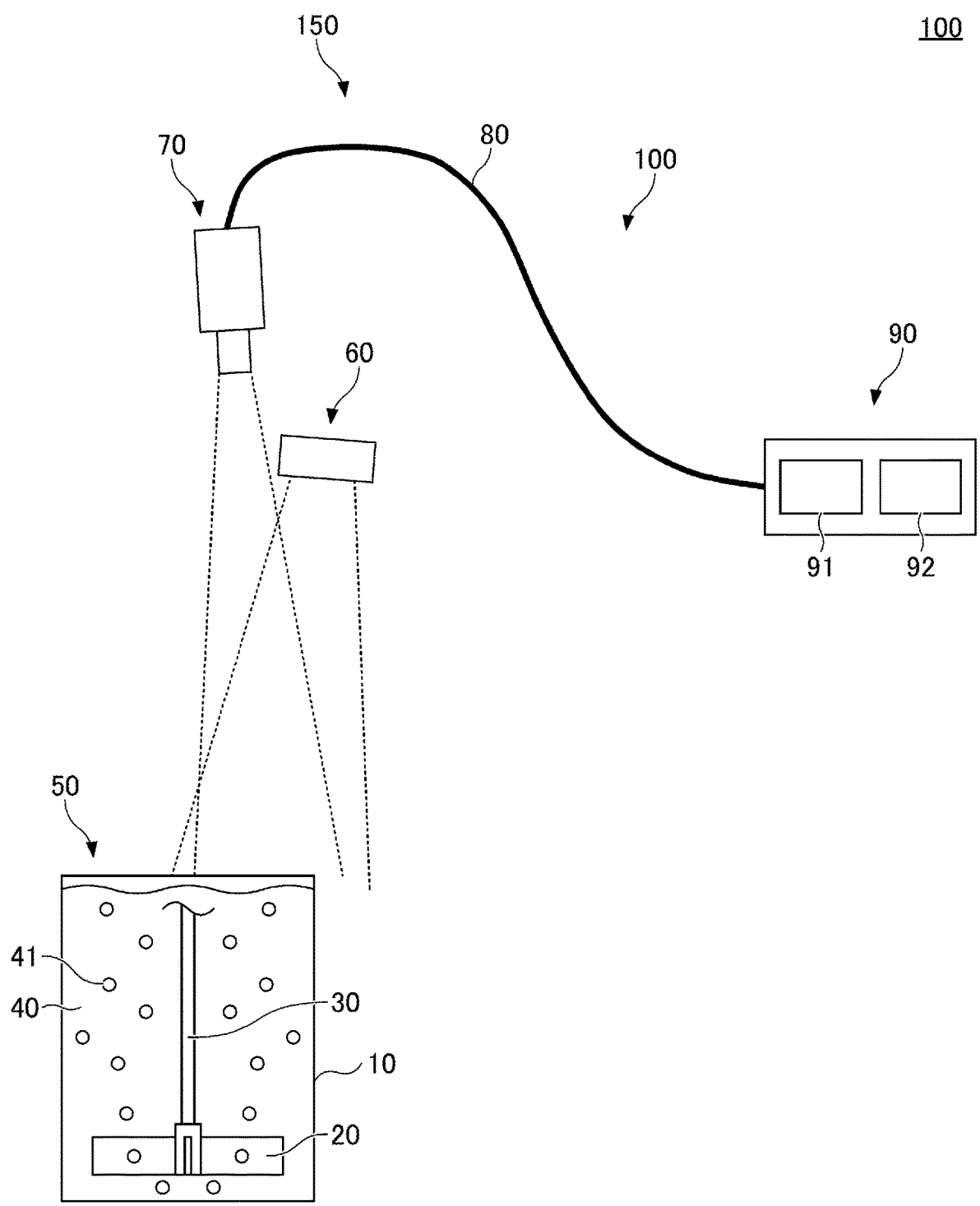
FIG. 1 is a schematic diagram showing a configuration of a froth bubble moving speed measuring device and a flotation apparatus according to an embodiment of the present invention.

FIG. 1 is a schematic diagram illustrating a configuration of a froth bubble moving speed measuring device and a flotation apparatus according to an embodiment of the present invention. A froth bubble moving speed measuring device 100 according to an embodiment of the present invention includes a light source 60, an area scan camera 70, a connection cable 80, and a computer 90. The computer 90 includes, for example, an image processing unit 91 and an arithmetic processing unit 92.

A flotation apparatus 150 according to the present embodiment includes a flotation machine 50 in addition to the froth bubble moving speed measuring device 100. The flotation machine 50 includes a flotation tank 10, an agitator blade 20, and an air supply shaft 30. Also, as a relevant component of the flotation apparatus 150, ore slurry 40 is stored in the flotation tank 10.

That is, the flotation apparatus 150 is configured by combining the flotation machine 50 and the froth bubble moving speed measuring device 100.

The flotation machine 50 according to the present embodiment can use a variety of commonly used flotation machines. The flotation apparatus 150 according to the present embodiment is characterized by the froth bubble moving speed measuring device 100, but first, an outline of the flotation machine 50 will be described.

The flotation tank 10 is a slurry storage unit for storing an ore slurry 40 containing a ground material to be subject to ore dressing. Because the ground material is a valuable metal that is subject to ore dressing or concentrate, flotation is performed for the ore slurry 40 stored in the flotation tank 10. Accordingly, although not shown in FIG. 1, the flotation tank 10 may include an extraction port at an upper portion of the flotation tank 10 for extracting valuable metals and a discharge port for draining tailings that are not valuable metals.

The agitator blade 20 is a froth bubble fining unit for fining froth bubbles 41 generated by air supplied from a lower end of the air supply shaft 30. The froth bubbles 41 generated at the lower end of the air supply shaft 30, that is, below the agitator blade 20, collide with the agitator blade 20 by rotation of the agitator blade 20 as the froth bubbles rise, thereby reducing the froth bubble diameter. Reducing the froth bubble diameter can increase the collision efficiency between ore particles in the ore slurry 40. Also, along with the froth bubble diameter, the moving speed of the froth bubble 41 influences the recovery properties of the ground material containing the desired valuable component.

The ground material (ore particle) having an exposed metal surface adheres to the froth bubbles and floats into the ore slurry 40, while the other ground material does not adhere to the froth bubbles 41 and settles to the bottom surface of the flotation tank 10. In this case, the froth bubbles 41 having appropriate moving speeds at which the ground material is likely to adhere to, are preferably generated while considering the balance between the ground material size to be concentrated and the buoyancy forces of the froth bubble 41 or the like. Therefore, in order to measure the froth bubble moving speed, a froth bubble moving speed measuring device 100 is provided.

As described above, the froth bubble moving speed measuring device 100 includes a light source 60, an area scan camera 70, a connection cable 80, and a computer 90. The light source 60, the area scan camera 70, or both are positioned above the flotation tank 10.

The light source 60 is a light emitting unit or an illuminating unit for illuminating the upper surface of the ore slurry 40 from above. As long as the upper surface of the ore slurry 40 can be illuminated from above, various light emitting units or illuminating units can be used as the light source 60. By irradiating the upper surface of the ore slurry 40 with light from above, the top portions of the froth bubbles 41 present in the ore slurry 40 shine white compared to the periphery of the froth bubbles 41, and the tops of the bubble shine more brightly than the periphery. That is, in an image obtained by the area scan camera 2 while irradiating the froth bubble 41 with light from the light source 60, light near the top portions of the froth bubbles shine white compared to the periphery of the froth bubbles.

The area scan camera 70 is an imaging unit for imaging the upper surface of the ore slurry 40 from above and for acquiring an image containing the froth bubbles 41. In the present embodiment, the area scan camera 70 is used, but various imaging units can be used as long as a portion or the entire area of the ore slurry 40 can be imaged. In the present embodiment, it is sufficient if the area scan camera 70 can capture the area irradiated with light from the light source 60, and thus the entire surface of the flotation tank 10 does not have to be imaged.

Figure 2:
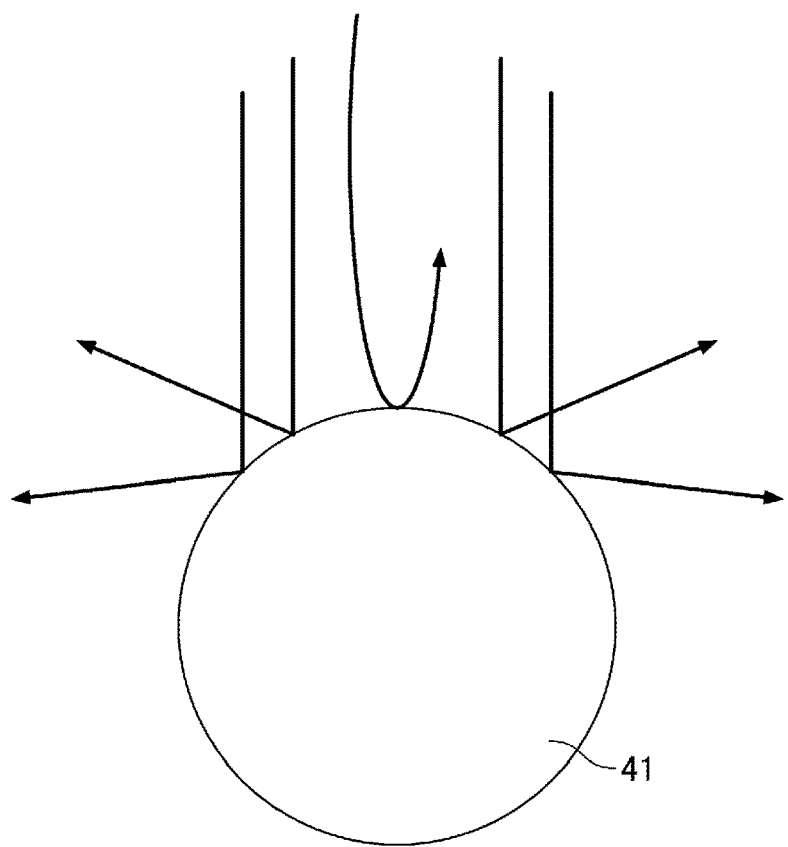
FIG. 2 is a diagram for explaining a reason why a top of a froth bubble shines white compared to the surrounding area.

FIG. 2 is a diagram for explaining a reason why a top of a froth bubble 41 shines white compared to a periphery. As shown in FIG. 2, when light emitted from the light source 60 is reflected against the froth bubble 41, light reflects upward from the top of the froth bubble 41 to the position where the area scan camera 70 is disposed. In contrast, because the light going to the periphery of the froth bubble 41 is reflected diagonally upward or laterally, the periphery shines weaker than the top.

Figure 3:
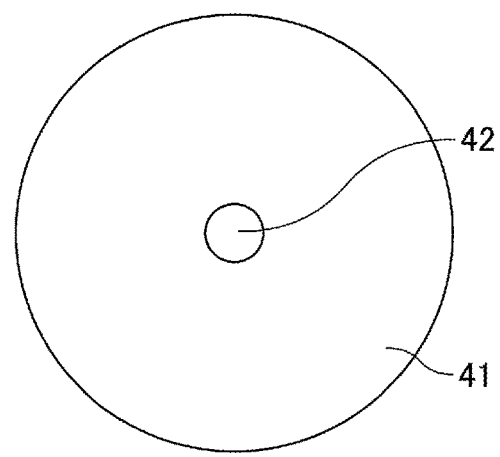
FIG. 3 is a diagram showing an example of an image of a froth bubble captured by an area scan camera from above.

FIG. 3 is a diagram showing an example of an image of such a froth bubble 41 captured by an area scan camera 70 from above. As shown in FIG. 3, an image including a white shining portion (reflected light region) 42 at a central portion of the froth bubble 41 is provided.

Because the size of the white shining portion is determined by the size of the froth bubble 41 and the curvature of the froth bubble 41, the curvature of the froth bubble 41 is considered to vary somewhat depending on the composition of the ore slurry 40. However, as also shown in FIG. 2, because the difference in brightness of the froth bubbles 41 is caused by the approximate spherical shape of the froth bubbles 41, the difference in composition of the ore slurry 40 is assumed to be only a minor difference and is assumed to be generally constant. Thus, the size of the froth bubble 41 is correlated with the size of the white shining portion. Factors determining the size of the white shining portion 42 include the size of the froth bubble 41 and the curvature of the bubble, as well as the size of the emitting surface of the light source 60, the distance from the top surface of the flotation tank 10 to the light source 60, and the distance from the top surface of the flotation tank 10 to the area scan camera 70. However, if none of these conditions are changed, they can be excluded from factors that affect the size of the white shining portion.

The area scan camera 70 is connected to the computer 90 via a network, and the images obtained from the area scan camera 70 are incorporated into the computer 90. The images from the area scan camera 70 may be transmitted by wired communication via the connection cable 80 or may be transmitted by wireless communication.

The computer 90 includes a CPU (Central Processing Unit), a RAM (Random Access Memory), a ROM (Read Only Memory), and the like, and has a structure for reading and running a program. The computer 90 serves as an arithmetic processing unit for performing an arithmetic process for calculating a froth bubble diameter based on an image acquired from the area scan camera 70. The computer 90 includes an image processing unit 91 and includes a function and a structure for processing the image acquired from the area scan camera 70.

Figure 4:
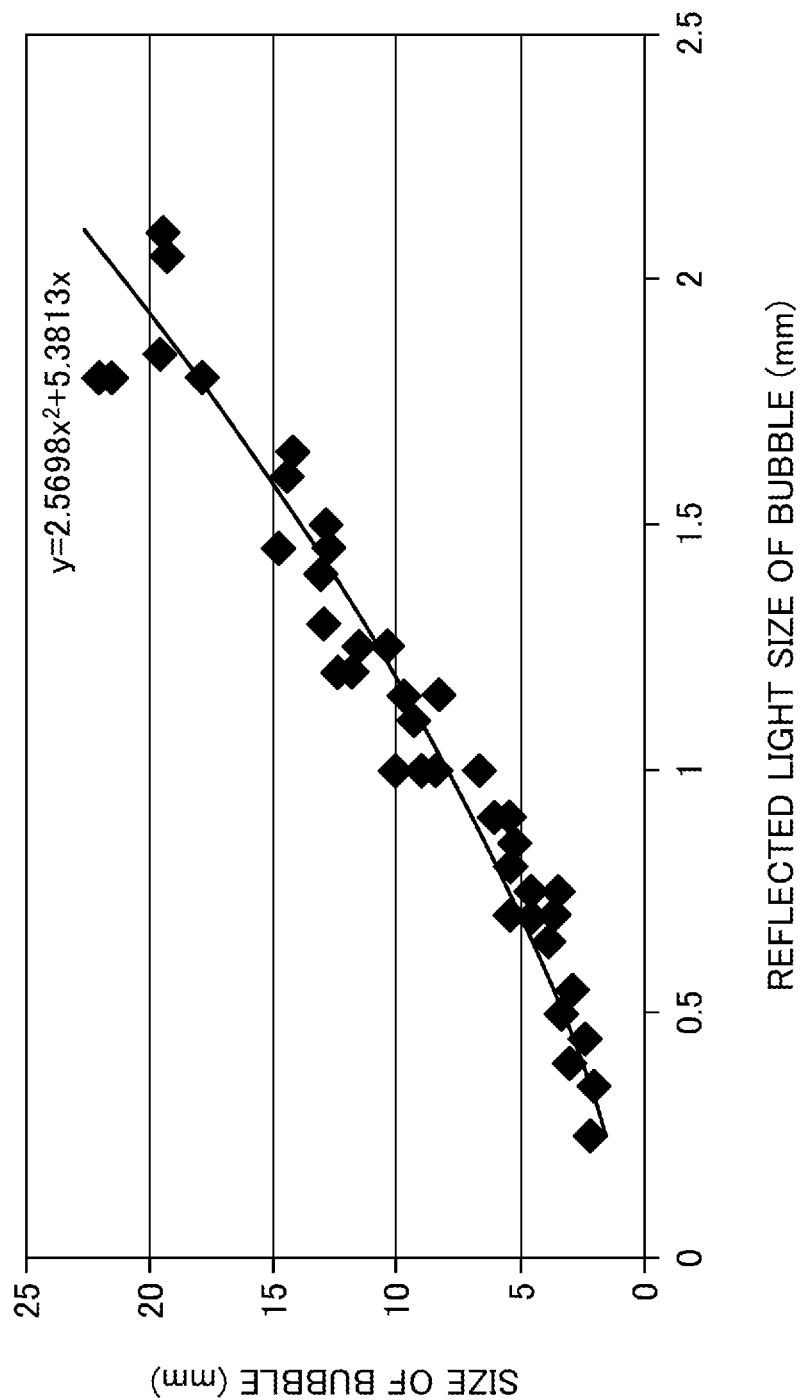
FIG. 4 is a diagram showing a correlation between a reflected light size of a froth bubble and an actual size of a froth bubble.

FIG. 4 is a diagram showing a correlation between a reflected light size of a froth bubble and an actual size of the froth bubble. In FIG. 4, the correlation between: the size of the reflected light when the froth bubble 41 is irradiated with light in advance in an experiment; and the actually measured size of the froth bubble 41 is obtained as a correlation equation, and the correlation is used to measure the size of the froth bubble 41. That is, in FIG. 4, the horizontal axis indicates the reflected light size of the froth bubble 41, and the vertical axis indicates the size of the froth bubble 41. Plotting these measurements indicates a degree of correlation between the size of the white shining portion and the size of the bubble. This relationship approximates to the regression equation.

In FIG. 4, a curve showing a correlation of plot points is an approximate regression equation. It can be seen that the approximate regression equation shown in FIG. 4 is a polynomial rather than a straight line. Such an approximate regression equation, once made, is generally applicable regardless of a composition of the ore slurry 40.

The area scan camera 70 is configured to capture the froth bubble 41 sequentially at a predetermined imaging time difference. That is, continuous imaging is enabled at predetermined imaging intervals. Thus, a plurality of images can be captured at a predetermined imaging time difference, and state changes of the froth bubble 41 at a predetermined imaging time difference can be recorded as an image.

Figure 5:
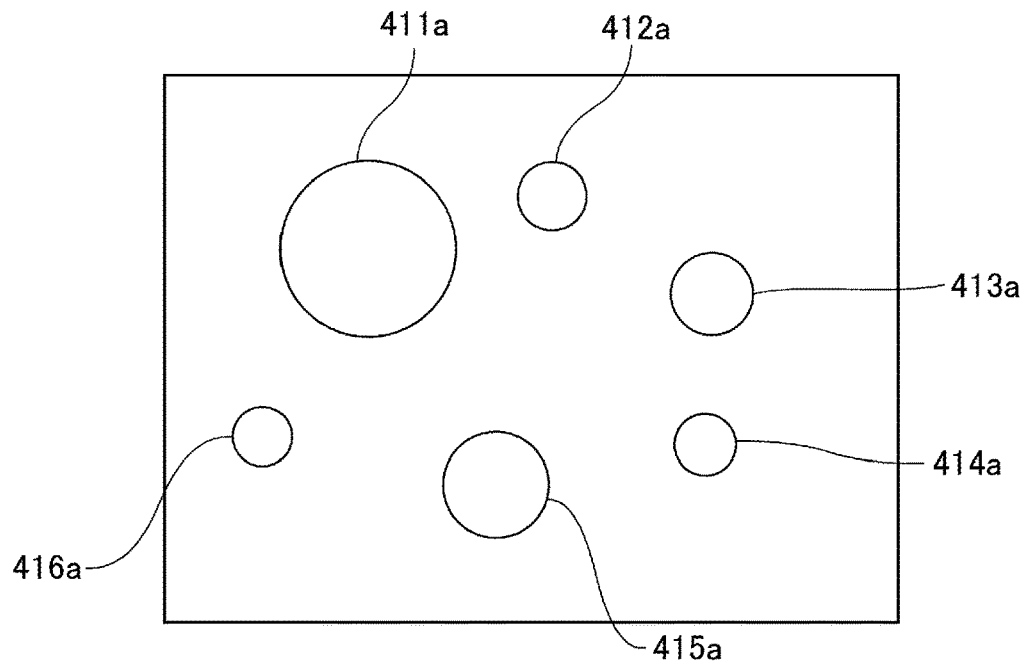
FIG. 5 is a schematic view of a froth bubble image at a certain time (t=n, t is time, n is a natural number)
Figure 6:
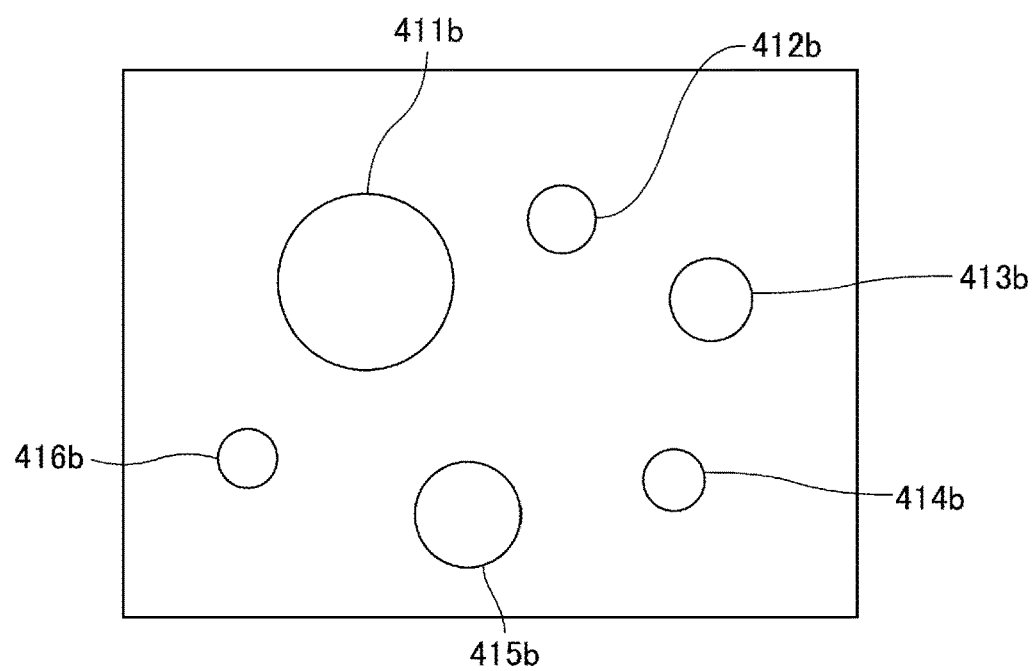
FIG. 6 is a schematic view of a froth bubble image at the next time point (t=n+1) in FIG. 5 that is continuously captured.
Figure 7:
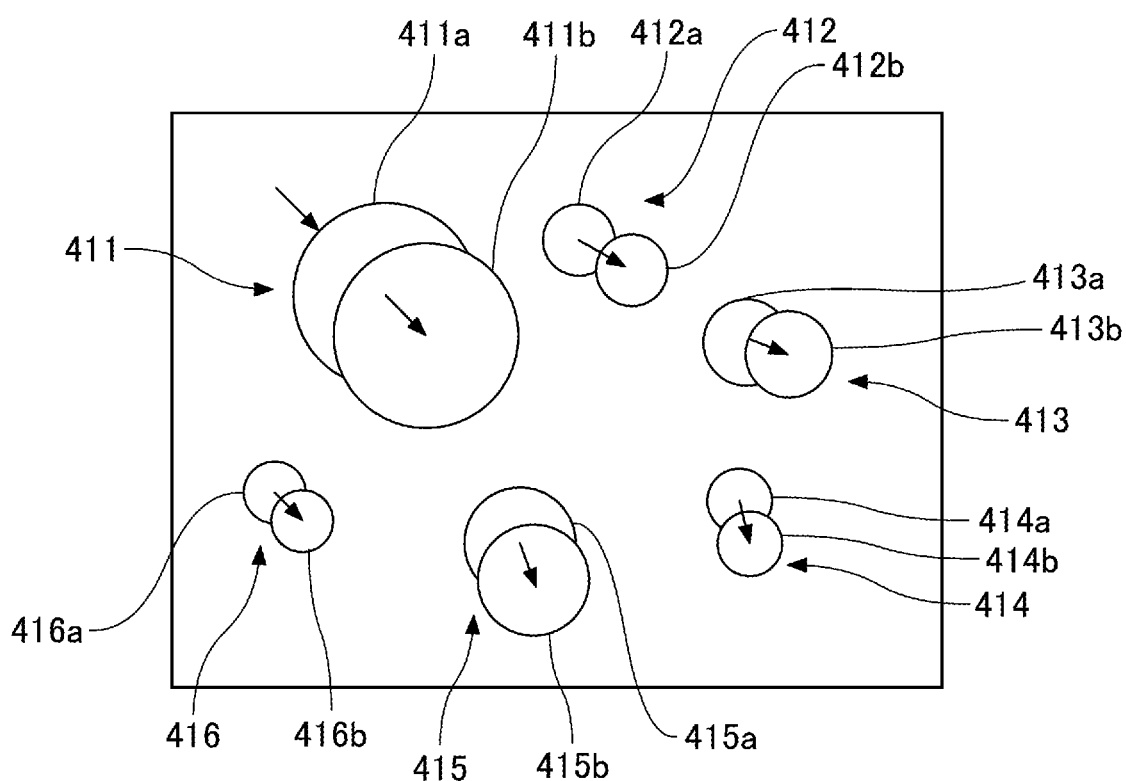

FIG. 5 is a schematic diagram of a froth bubble image at a certain point in time (t=n, t=time, n=a natural number), and FIG. 6 is a schematic diagram of a froth bubble image at the next point (t=n+1) of FIG. 5, which is continuously imaged. FIG. 7 is an image of a froth bubble in which FIGS. 5 and 6 are superimposed.

For example, when an imaging period is set to T, the area scan camera 70 captures the imaging area continuously (intermittently in the flow of time) and acquires an image at each imaging period at each of t=T, 2T, 3T, nT, and (n+1)T.

FIG. 5 is a captured (acquired) image at t=nT, and in FIG. 5, each of the six froth bubbles 411a to 416a is present at each position in the captured image.

FIG. 6 is a captured (acquired) image at t=(n+1)T. In FIG. 6, each of the six froth bubbles 411b to 416b is present at each position in the captured image. Even when merely visually comparing FIG. 5 with FIG. 6, the difference is not so clear.

FIG. 7 is a superimposed image of FIGS. 5 and 6, and the displacement of positions between the froth bubbles 411a to 416a in FIG. 5 and the froth bubbles 411b to 416b in FIG. 6 can be understood.

This distance of displacement between FIG. 5 and FIG. 6 is the distance of movement of the froth bubbles 411 to 416 in the time difference T.

Here, the arithmetic processing unit 92 assumes that the same froth bubbles 411 to 416 have moved when the froth bubbles 411a to 416a at time t=nT and at time t=(n+1)T overlap with each other. As such, because the overlap of froth bubbles between images is considered to be a movement of the same froth bubbles, imaging is preferably performed at a sufficiently fast imaging rate. Specifically, the imaging time difference T is preferably a time difference in which the movement distance of the froth bubbles 411 to 416 falls within the diameters of the froth bubbles 411 to 416.

The light emitted from the light source 60 is preferably uniform surface-emitted light with a narrow directional angle covering the imaging area. This is because the narrower the directional angle, the better the contrast of the area that shines white.

The froth bubbles 411 to 416 may be arithmetically processed to determine the diameters of the froth bubbles 411 to 416 or may be compared with the white shining portions. In either case, there are many cases in which the white shining centers are compared with each other, and there is no difference in the arithmetic process.

The edges of the froth bubbles 411 to 516 may be compared with each other, instead of comparing the centers of the white shining portions with each other. For example, in FIG. 7, straight lines parallel to the direction of movement of the froth bubbles 411 to 416 pass through the centers of the froth bubbles 411b to 416b of T=(n+1)T to calculate the distance between the non-overlapping edges of the froth bubbles 411a to 416a, 411b to 416b that intersect the straight lines. The calculated distances are the travel distances of the froth bubbles 411 to 416 in the time difference T. The froth bubble 411 of FIG. 7 shows an example of the relationship between its edges.

Thus, from the two images acquired at the imaging period T, the movement distance in the two-dimensional plane (the upper surface of the ore slurry 40) in the time difference T of each of the froth bubbles 411 to 416 can be understood.

With respect to the imaging of the froth bubble 41, imaging the froth bubbles 41, 411 to 416t within the ore slurry 40 is difficult, and the movement of the froth bubbles 41, 411 to 416 in the plane of the upper surface of the ore slurry 40 is substantially imaged.

The moving speeds of the froth bubbles 411 to 416 are then calculated by simply dividing the moving distances of the centers of the froth bubbles in the two-dimensional plane by the imaging time difference (imaging period) T.

That is, for example, if the moving distance between time t=nT and time t=(n+1)T of the froth bubble 411 is denoted by d/T, the movement speed is determined by d/T. This is the same for each of the froth bubbles 412 to 416, and if applied to each of the froth bubbles 411 to 416, the moving speed can be calculated for each of the froth bubbles 411 to 416.

The flotation machine 50 is generally cylindrical and has a drive unit of the agitator blade 20 disposed at the upper center to cut through supplied air and generate fine bubbles. Therefore, it is physically difficult to image the entire surface from the top of the flotation machine 50. However, because the state of the froth bubble 41 has no dependency on the location, an imaged portion thereof may represent the entire surface. Thus, a field of view capable of imaging a portion of the upper surface of the flotation machine 50 is sufficient. The height of the camera and lens from the upper surface of the flotation machine 50 may be determined according to the required imaging field of view.

Further, the image processing unit 91 performs various image processes for removing a noise from the image and increasing contrast for easier arithmetic processing. For example, if the binary image is acquired from the image obtained by setting a predetermined threshold value, the size of the froth bubble 41 can be easily determined. Such a process is performed by the image processing unit 91. The image processing unit 91 may be provided inside the computer 90 or may be provided separately outside the computer 90.

In FIG. 1, the position of the light source 60 and the area scan camera 70 are shown schematically, but a fixing unit may be provided and secured in a position suited for the intended use.

Also, although the flotation machine 50 does not show components other than the flotation tank 10, the agitator blade 20, and the air supply shaft 30, the flotation machine 50 may include various components necessary for constructing the flotation apparatus 150.

The adjustment of the amount of air blown into the slurry, the adjustment of reagents, and the adjustment of the rotational speed of the impeller of the flotation machine can be performed based on the measured moving speed of the froth bubbles 41, 411 to 416, so that the conditions of the froth bubbles 41 can be improved.

In FIGS. 2 to 4, the description indicates that the diameters of the froth bubbles 41, 411 to 416 can be calculated. By obtaining both the diameters and the moving speeds of the froth bubbles, the conditions of the froth bubbles can be adjusted to be better.

Thus, it is possible to calculate the moving speeds of the froth bubbles 41, 411 to 416 and to adjust the conditions accordingly, or to automate the feedback control so that the froth bubbles 41, 411-416 are in good condition.

As described above, the flotation apparatus 150 according to the present embodiment can form a flotation apparatus 150 that can easily and accurately adjust the froth bubble by incorporating a variety of froth bubble moving speed measuring devices 100 into the flotation machine 50.

Next, a processing flow of a froth bubble moving speed measuring method and a flotation method according to the embodiment of the present invention will be described.

Figure 8:
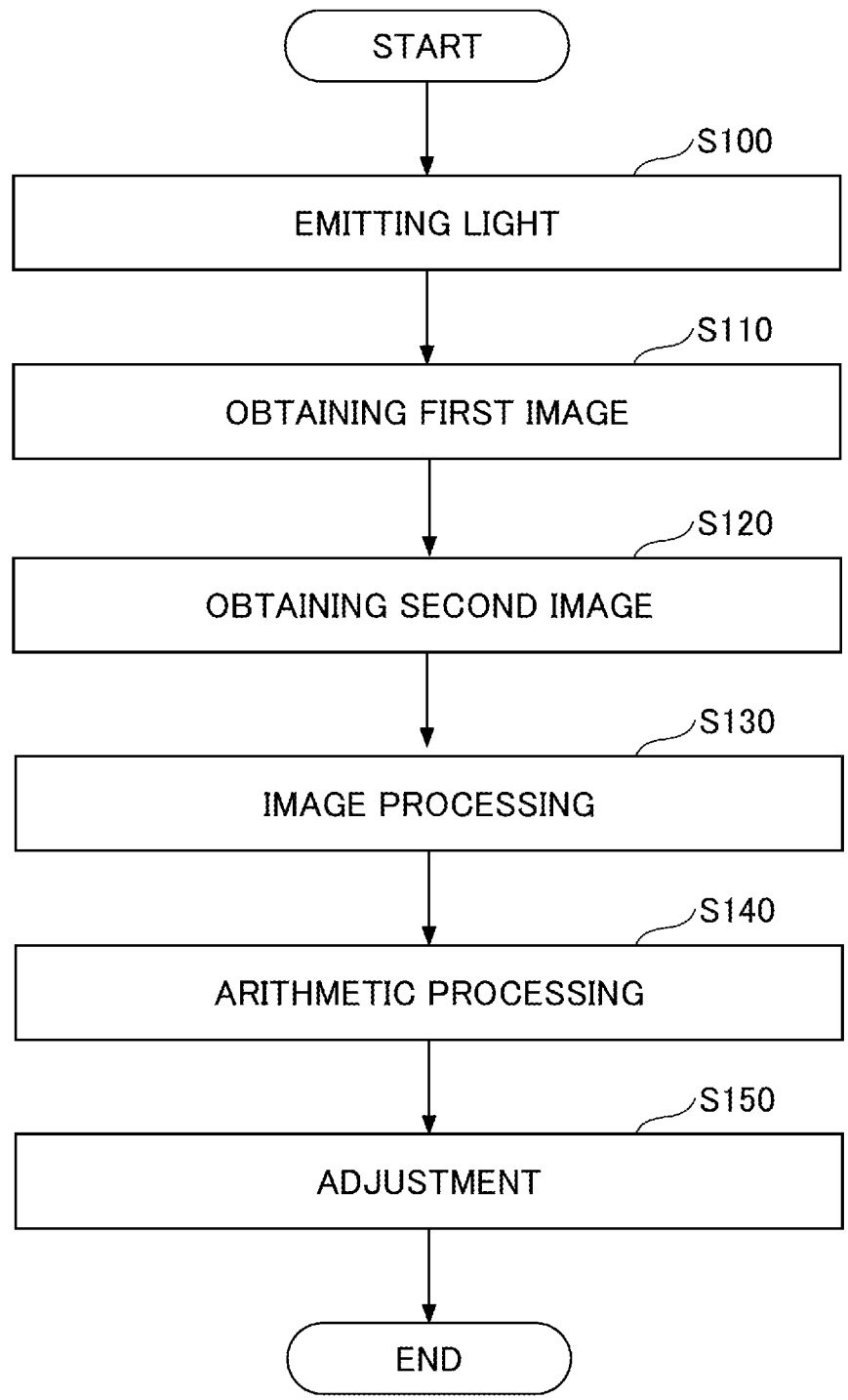
FIG. 8 is a flow diagram illustrating an example of a processing flow of a froth bubble diameter measuring method and a flotation method according to an embodiment of the present invention.

FIG. 8 is a flow diagram showing an example of a processing flow of a froth bubble diameter measuring method and a flotation method according to an embodiment of the present invention. The description of the components described above is omitted while using the same reference numerals to the corresponding components.

In FIG. 8, in step S100, a light source 60 illuminates an upper surface of an ore slurry 40 stored in a flotation tank 10. This causes a top portion of a froth bubble 41 in the ore slurry 40 to shine white. The top corresponds to the approximate center of the froth bubble 41 as described in FIGS. 2 and 3.

In step S110, the area scan camera 70 captures the top surface of the ore slurry 40 and acquires a first image captured from the top surface of the ore slurry 40. The acquired first image includes a froth bubble 41a having a white shining portion 42. The acquired image data is transmitted to the computer 90 by wire or wireless communication.

In step S120, the area scan camera 70 captures the top surface of the ore slurry 40 and acquires a second image captured from the top surface of the ore slurry 40. The acquired second image includes a froth bubble 41b having the white shining portion 42, but the position of the froth bubble 41b includes a position different from the position of the froth bubble 41a in the first image. The acquired image data is transmitted to the computer 90 by wire or wireless communication.

In step S130, an image process is performed on the two images received by the image processing unit 91. The image process, for example, acquires a binary image from the received image using a predetermined threshold value. This removes a noise from the image acquired by the area scan camera 70.

Further, in the above-described flow, the second image acquisition is performed after the first image acquisition, but the first image may be processed after the first image acquisition, and then the second image may be processed after the second image acquisition.

In step S140, an arithmetic processing unit 92 of the computer 90 performs a calculation process to calculate the moving distance between the froth bubbles 41a and 41b and to calculate the moving speed. On this occasion, the computer 90 may simultaneously calculate the size of the froth bubble from the size of the reflected light using the approximate regression equation stored in advance.

As shown in step S150, various adjustment processes may be performed based on the measured froth bubble moving speed. That is, air supply conditions and agitating conditions can be optimized. Such adjustments may be made by a human looking at the measurement results of the froth bubbles, but also may be made by the computer 90 under automatic control. If a human performs the adjustment, the computer 90 outputs the measurement results to a display or the like. In addition, when the computer 90 performs automatic adjustment, the computer 90 adjusts the output of the air supply shaft 30, the driving speed of the agitator blade 20, and the like based on the measurement results. On this occasion, it will be understood that the measurement results may be output together. From this viewpoint, step S150 is not required, but may be executed as necessary.

As described above, according to the froth bubble diameter measuring method and the flotation method according to the present embodiment, the froth bubble diameter can be automatically measured, and adjustments can be made to optimize the froth bubble diameter if necessary, thereby allowing high-quality flotation.

Also, according to the present invention, because a froth bubble speed can be quantitatively measured compared to qualitative determination by visual inspection, a reagent, an air volume, and an impeller (rotor blade) speed can be precisely adjusted in real time.

Although the preferred embodiments of the invention have been described in detail above, the invention is not limited to the embodiments described above, and various modifications and substitutions can be made to the embodiments described above without departing from the scope of the invention.

Although the present invention has been described in accordance with the examples, the invention is not limited to the above examples, and various modifications can be made within the scope of the claims.

What is claimed is:

1. A flotation apparatus, comprising:
a flotation tank;
an agitator blade provided in the flotation tank;
an air supply shaft provided in the flotation tank and supplies air from below the agitator blade at the lower end of the air supply shaft;
a light source configured to illuminate an upper surface of the flotation tank;
an imaging unit configured to capture at least a part of the upper surface of the flotation tank;
a memory; and
a processor coupled to the memory and configured to:
process an image captured by the imaging unit;
calculate a moving speed of a froth bubble by calculating a moving distance of the froth bubble based on the image processed; and
adjust a driving speed of the agitator blade based on the moving speed of the froth bubble calculated.

2. The flotation apparatus as claimed in claim 1,
wherein the imaging unit is configured to capture a continuous still image at a predetermined capturing time difference, and
wherein the processor is configured to specify the moved froth bubble from a degree of overlap of the froth bubble detected in each image of the continuous still image captured by the imaging unit, and to calculate the moving speed of the froth bubble based on the moving distance of the froth bubble and the capturing time difference of the continuous still image.

3. A flotation method performed by using a flotation apparatus that includes: a flotation tank; an agitator blade provided in the flotation tank; and an air supply shaft provided in the flotation tank and supplies air from below the agitator blade at the lower end of the air supply shaft, the method comprising steps of:
- irradiating an upper surface of the flotation tank with light;
- acquiring an image by capturing at least a part of the upper surface of the flotation tank;
- image processing the acquired image;
- calculating a moving speed of the froth bubble by calculating a moving distance of the froth bubble based on the image processed in the image processing step; and
- adjusting a driving speed of the agitator blade based on the moving speed of the froth bubble calculated in the calculating step.

4. The flotation method as claimed in claim 3,
- wherein the capturing of the image includes capturing a continuous still image at a predetermined capturing time difference, and
- wherein the calculating of the froth bubble moving speed includes identifying the moved froth bubble from a degree of overlap of the froth bubble detected in each image of the continuous still image, and calculating the moving speed of the froth bubble based on the moving distance of the froth bubble and the capturing time difference of the continuous still image.

* * * * *